May 25, 1943.     H. W. STRAAT     2,319,889
REFRACTOMETER
Filed July 5, 1941

HAROLD W. STRAAT
INVENTOR
BY
ATTORNEYS

Patented May 25, 1943

2,319,889

UNITED STATES PATENT OFFICE 2,319,889

REFRACTOMETER

Harold W. Straat, Irondequoit, N. Y., assignor to Bausch & Lomb Optical Company, Rochester. N. Y., a corporation of New York Application July 5, 1941, Serial No. 401,167

8 Claims. (Cl. 88—14)

My invention relates to optical instruments and more particularly has reference to that class of instruments used to measure index of refraction and generally known as refractometers.

This application is a continuation in part of my copending application Serial No. 304,032, filed November 13, 1939, for Refractometer.

One object of my invention is to provide a small, compact refractometer which is of rugged construction yet possesses a simple design which readily lends itself to facile and accurate operation.

Yet another object of the invention is to provide a hand refractometer in which the image of a scale is viewed through prism means.

A further object of my invention resides in the provision of a hand refractometer wherein the sample to be examined is placed in contact with a hypotenuse face or base of prism means and a scale is viewed through a different face of such means, this scale being preferably but not necessarily located so as to optically appear at infinity with respect to the prism means.

With these and other objects in view which may be incident to my improvements, the invention consists in the parts and combinations to be hereinafter set forth and claimed, with the understanding that the several necessary elements comprising my invention may be varied in construction, proportion and arrangement without departing from the spirit of the invention or exceeding the scope of the appended claims.

In order to make my invention more clearly understood, I have shown in the accompanying drawing means for carrying the same into practical effect without limiting the improvements in their useful applications to the particular constructions which, for the purpose of explanation, have been made the subject of illustration.

Referring particularly to the drawing.

Figure 1:
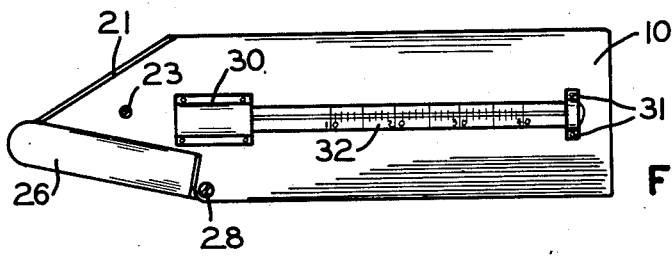
Figure 1 is a side elevation of one embodiment of my invention.

In the drawing, I have shown several forms of refractometers which may be embodied in hand instruments, similar reference numerals being employed throughout the different views to designate like parts. With special reference to Figures 1 through 5, there is shown a refractometer the essential parts of which, as will hereinafter appear, comprise a prism, a transparent plate with scale means thereon, and specimen supporting means, all preferably carried by a suitable support such as the tube or casing 10 although other optical elements are generally associated with the instrument to improve its operating efficiency.

Figure 2:
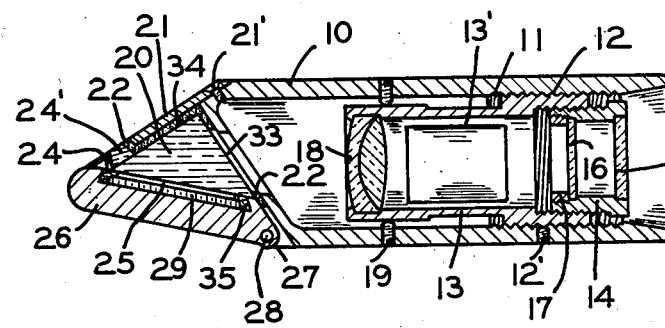
Figure 2 is a vertical section of the refractometer of Figure 1.
Figures 3, 4:
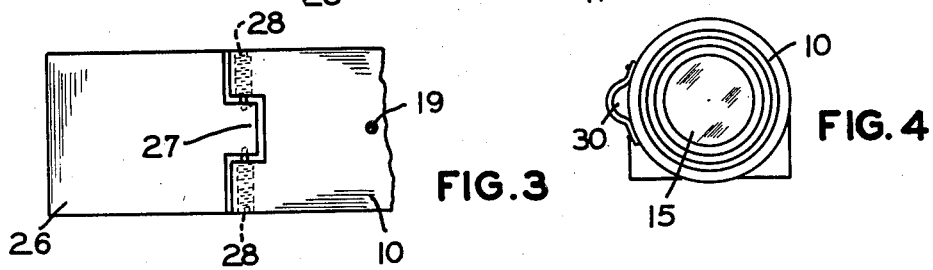
Figure 3 is a fragmentary bottom view of the instrument of Figure 1 and shows the cover construction.
Figure 4 is a rear elevation of the refractometer illustrated in Figure 1.

As may be observed in Figure 2, the tube 10 is internally threaded at one end, as at 11, to receive the threaded end 12 of a sleeve 13 which is adapted to be mounted within the tubular casing 10. A cell 14 is threaded into the outer end of sleeve 13 and is closed with light diffusing means such as the plate or disk 15 which is fixedly mounted in the cell by burnishing or in other appropriate manner. Mounted in the inner end of the cell 14 in spaced relation to disk 15 and held in place by the threaded ring 17 is the transparent disk 16 on which are engraved or etched suitable scale means.

In best practice some type of lens means is used with the instrument to optically locate the scale at infinity as well as to magnify it. For this purpose a lens 18, such as the doublet shown in Figure 2, is mounted in the inner end of the sleeve 13 in some suitable manner, as for example by burnishing. Preferably, lens 18 is located at a distance from the scale 16 which is equal to the focal length of the lens so that the lens images the scale at infinity and thereby avoids the effect of parallax when making an instrument reading.

Of course, if desired, the lens 18 may be located at a distance which is less than its focal length from the scale although the effectiveness of this practice to eliminate parallax will not be as successful as where the scale is set in the front focal plane of the lens as shown in Figure 2. On the other hand, location of the lens 18 so that the scale disk is outside of the focal length of the lens, in order to cause formation of a real image, is to be avoided for obvious reasons. In this latter connection, one disadvantage resides in the fact that the eye point for viewing the scale would require location at such a long distance from the scale as to cause an impractical instrument design.

The inner unthreaded portion of sleeve 13 is formed with a reduced diameter and has parts of its wall cut away as at 13'. This construction affords a yieldable mounting for the lens 18 and since the inner unthreaded portion of sleeve 13 is unsupported except by the screws 19, which extend through the wall of tube 10 and bear on the sleeve, the lens 18 may be adjustably positioned by means of screws 19. A set screw 12' is also shown in Figure 2 as extending through the casing 10 for the purpose of positively locking sleeve 13 in engagement with the tubular casing.

Suitable prism means have been mentioned as an essential part of the instrument. One form of such means is disclosed in the prism 20 of triangular cross section shown in Figure 2 as mounted on the end of the tubular casing 10 remote from the scale and diffusing disk. It is important to note, however, that it is unnecessary to employ a prism which is of the shape illustrated. In this connection, the only requirements for the prism are that it have a base or hypotenuse surface 25 to each end of which is joined an oblique face 33, 34 and that the oblique faces converge towards each other at equal, acute angles from the base or hypotenuse face. The degree of the angles of the oblique faces with the base of the prism is chosen in a manner well known to the art and, as will become apparent, consequently needs no detailed explanation.

Should the oblique faces 33 and 34 of the prism be continued until they meet in an edge which is opposite to the base 25, an isosceles prism, such for example as the prism shown in Figure 2, will be provided. However, as will be presently explained, the use of an isosceles prism is not a necessity as the operation of the refractometer may be equally well carried out by employing a prism similar to the prism 20 but which has been truncated by a cutting plane or other cutting surface passed through the oblique faces of the prism between the hypotenuse face and the prism edge opposite to it. This leaves a portion of the oblique face 34 through which light may emerge after its entrance into the prism through the remaining portion of the entrance surface 33 and its reflection by the prism base 25. Use of a truncated prism will be influenced by the particular design given to the instrument and in some constructions will be highly desirable as an aid to providing a refractometer of a compact character.

One practice cements an observation button, of transparent material in the form of a truncated right cone 24', onto the oblique face 34 of the prism 20, which surface serves as a light exit. In mounting the prism onto the refractometer, use is generally made of an opaque plate 21 which is fastened to the end of the tubular casing 10 by means of suitable screws 21'. Plate 21 is provided with an observation opening 24 which is preferably filled with a truncated cone or button of glass 24', cemented to the face 34, so that foreign matter will not accumulate in the opening 24. Suitable cement 22 may be employed to cement the oblique faces and the end or parallel faces of the prism to the plate 21 and the casing 10. If desired, centering screws 23 may be provided to extend through the casing 10 to contact opposite parallel faces of the prism 20. Manipulation of the screws 23 may be made prior to the setting of the cement 22 to permit fine adjustment of prism 20 into suitable alignment with the light openings in the end of the casing 10 and in the plate 21.

Light enters my instrument through the diffusing and scale disks and after entering the prism through the surface 33 has a portion thereof reflected by the base 25 to emerge through the other oblique surface 34. When using the refractometer of Figure 2, one looks through the oblique exit surface 34 of the prism to observe the scale means and hence in effect traces the light rays which enter the instrument backwards through the instrument to their source. In addition to serving as a part of the mount for prism 20, plate 21 with its aperture 24 serves as a diaphragm which limits the field of view to that portion of the image which is substantially free from aberration.

However, if a highly corrected magnifier, distortion-free and having substantially zero chromatic difference of magnification were used, the entire oblique exit surface 34 of the prism could be left uncovered. For that matter, the oblique exit surface of the prism may be left uncovered where any lens is employed if one is willing to accept the accompanying spherical aberration to be normally expected with such a lens. Obviously, the only effect of omitting the diaphragm is to decrease the accuracy and efficiency of the instrument by increasing the undesired effect of spherical aberration.

The wall of the casing 10 is cut away adjacent the reflecting base 25 of the prism 20 to receive a tongue 27 formed on the prism cover or specimen holder 26. The member 26 is hinged to the casing 10 by pintles 28 which are carried by the casing and which engage the tongue 27 in the manner shown to permit the member 26 to swing towards or away from the reflecting base 25 of the prism. A plate 29 of black carrara glass or other black material, which serves as a specimen support, is carried on the side of the holder 26 adjacent the prism 20. Any suitable securing means such as cement 35 may be employed in mounting the plate 29 on the holder 26.

In use of the refractometer, the specimen, for example a sample of a sugar solution, is placed on the face 25 of the prism 20, the cover 26 is closed, the instrument is pointed towards a light source so that light enters the casing 10 from the end thereof adjacent to the diffusing disk 15 and the observer looks through the observation button 24' towards the scale plate 16. The light rays emitted by the light source after passage through the diffusing disk 15 and scale disk 16 are converged by the lens 18 towards the prism 20 to enter the latter through the face 33 and are there refracted towards the prism base 25.

Differences in refractive index between the prism 20 and the specimen are taken advantage of by my invention to determine the refractive index of the specimen in accordance with the well known principle of physics that a light ray which passes from an optically denser medium to an optically rarer medium will be refracted or totally reflected depending upon whether the angle of incidence of the ray with the second or rarer medium is less than or greater than the so-called critical angle of the first medium. To this end the prism 20 is chosen to be of high refractive index. Certain of the light rays which enter the prism 20 will strike the interface between the prism base 25 and the specimen at an angle of incidence which is greater than the critical angle just mentioned and by reason of reflection will be directed towards the prism face 34 to emerge through the observation button 24', while the remainder of these rays will have an angle of incidence which is less than the critical angle and will be refracted to pass through the prism base 25 and enter the specimen or sample undergoing analysis.

Figure 5:
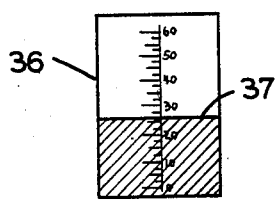
Figure 5 shows the image seen by an observer when using the instrument of Figures 1-4.

An observer looking through the button 24', in effect follows the path of the light rays backwards towards their source and sees, by reason of reflection, a magnified virtual image of the scale such as indicated by the reference numeral 36 in Figure 5. In the observer's field of view there is seen a shadow which is caused by the refracted light rays which pass into the specimen. This shadow appears as a virtual image superposed on the virtual image of the scale formed by the lens 18.

A boundary edge 37 marks the top of the shadow and also the division between it and the remainder of the scale image, which portion of the latter is seen in bright contrast to that on which the shadow is superposed. In the form of the invention shown in Figure 2, the portion of the scale image covered by the shadow will be faintly visible through this darkened area.

For convenience, the scale 16 is usually graduated in per cent solids in solution which is a factor directly related to the refractive index of a solution. Readings of the instrument are made directly by noting the location of the boundary edge 37 on the scale. This direct reading is possible since the prism means and the scale means are positioned with respect to each other so that the boundary edge of the shadow produced by a specimen being tested will appear to extend in transverse relation to the scale. Due to the inversion of the scale markings, the image of the scale will present this indicia in erect form.

Reference to the operation of my instrument will clearly bring out that the refractometer will function when consisting only of a prism, a scale and specimen holding means, the other elements shown and described being associated therewith to the end of increasing the accuracy of the instrument as well as to permit its compact design. The prism, which acts in the nature of a viewing aperture for observing the scale, may in fact be truncated. It is only necessary with the instrument of Figure 2 to employ a prism of the character described which is provided with a completed hypotenuse face or base 25 and partially finished entrance and exit faces. Moreover, these latter surfaces need only extend from the face 25 for a distance sufficient to allow the entrance and the emergence of light rays coming from the scale.

Omission of the diffusing disk 15 will reduce the accuracy with which the scale may be read by providing an unevenly illuminated field but otherwise will have no effect upon the operation of the instrument. Although at the sacrifice of certain advantages leading to accuracy and compactness, it will be apparent that the instrument may be operated without a lens if a scale of suitable size is placed at a distance from the prism means sufficient to allow an observer to read the scale when looking through the exit face 34 of the prism. However, where a lens is used, it should be noted that its location is not restricted to a distance from the scale disk 16 which is equal to the focal length of the lens. While such a position is preferred, its selection is to the end of avoiding parallax by optionally placing the image at infinity. Similarly, plate 21, which serves as a diaphragm designed to limit spherical aberration of the lens 18, may be dispensed with at the expense of the instrument accuracy but without other effect upon the operation of the instrument.

The embodiment of the invention shown in Figures 1 through 5 is a hand refractometer primarily designed for measuring sugar solutions containing from zero to sixty percent total solids. I have found, in an instrument of this nature, that a seven power magnifier corrected for distortion and chromatic difference of magnification may be successfully employed for the lens generally designated by the reference numeral 18.

As pointed out, the entrance and exit surfaces of the prism should form equal angles with the hypotenuse face or base thereof. One form of prism admirably suited for an instrument of the character described consists of glass of refractive index equal to 1.517. In shape, the prism has two oblique faces 33 and 34 which respectively provide an entrance and an exit surface and which are each inclined to the hypotenuse face or base 25 at an angle of 47°. Where a completed triangular shaped prism of this description, rather than a truncated form of prism, is employed, the angle between the oblique faces 33 and 34, will, of course, be equal to 86°. Since the oblique faces 33 and 34 form equal angles with the base 25, the chromatic refraction errors introduced at the entrance surface are corrected at the exit surface.

The range of indices which may be covered by the prism 20 is relatively large so that it becomes necessary to use a lens having a wide field in order to view both limits of the range. To avoid the use of a lens of this character, which is usually of a complicated design, as well as to maintain the compactness of the instrument by avoiding the use of the large sized scale necessary to cover the complete range, it is desirable to utilize only a portion of the full range of indices which the prism can cover. For example, I have found that a very satisfactory and highly practical instrument may be provided for testing sugar solutions wherein the utilized portion of the full range of the prism is restricted to solutions containing from zero to sixty percent total solids.

Where a portion only of the total range of the prism is employed, it is necessary to center this portion of the full range so that the extreme limits thereof will fall at substantially equal distances above and below the optical axis of the lens 18. Centering of the utilized range in the field of view so that it is symmetrical with the optical axis of the lens 18 is effected by tipping the prism 20 relative to such axis. This is accomplished for the particular refractometer described when the hypotenuse face or base 25 of the prism is set at an angle of 12° with the optical axis of the lens.

Suitable positioning of the plate 21 will allow the prism 20 to assume, at least approximately, the desired angular relation with the optical axis of the magnifier when the prism is cemented to the plate. Fine adjustment of this angular relation may be carried out either by adjusting movement of the prism or of the lens 18. I have, however, disclosed means for effecting the fine adjustment of the lens 18 which makes use of the adjustable mounting provided for the lens by supporting it at the free end of the sleeve 13.

Suitable manipulation of the adjusting screws 19 will cause the free end of sleeve 13 to be shifted from any fixed position and consequently will allow the lens 18 to be moved transversely of the casing 10 by the minute amount necessary to obtain the desired angular relation between its optical axis and the base of the prism. In practice, the instrument is adjusted with the use of a solution of known refractive index. If the boundary edge 37 formed by a test sample known refractive index fails to fall on the image of the proper scale marking, then the position of the lens 18 is adjusted through the use of the fine adjustment screws 19 until the boundary line 37 is properly located.

Fine centering of the prism faces 33 and 34 with respect to the entrance and exit openings formed at the end of the casing 10 and in the plate 21 for the passage of light rays into and out of the prism may be effected by adjustment of the centering screws 23 before the cement 22 has set. Screws 23 facilitate operations in cementing the prism to the plate 21 and also assist in holding the prism while the cement is hardening.

It is desirable to know the temperature of the specimen due to the relation which exists between temperature, concentration of solids in solution and refractive index. To this end, I provide straps 30, secured to the exterior of the casing 10 by screws or rivets 31, for mounting a thermometer 32 on the instrument. Thermometer 32 gives the temperature of the casing 10, a temperature substantially equal thereto being rapidly assumed by the specimen undergoing analysis with the result that the thermometer readings will also give the temperature of the specimen.

While the operation of the refractometer has been disclosed in connection with a liquid specimen, it will be apparent that the instrument may be used to determine the refractive index of solids. In the latter instance, the solid is connected to the base 25 of the prism 20 by a fluid of a suitable character and in a manner well known to the art.

Figure 6:
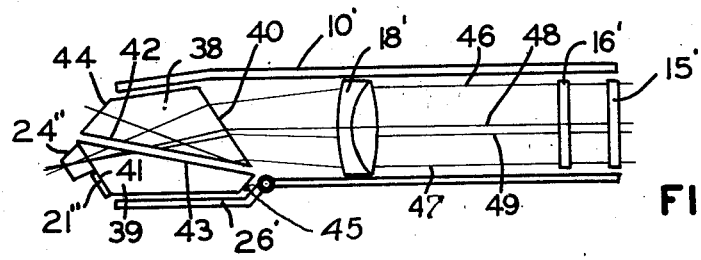
Figure 6 is a diagrammatic view of a modification of the invention.

A modification of the invention is diagrammatically illustrated in Figure 6 of the drawing wherein the optics for such form of instrument are disclosed. Generally, the refractometer of Figure 6 comprises a diffusing disk 15', scale disk 16' and lens 18', respectively, similar to the diffusing means 15, scale means 16 and lens means 18 of Figure 2. Elements 15', 16' and 18' are located with respect to each other in a manner similar to the corresponding elements of Figure 2 and to this end may be similarly mounted within a suitable casing.

The modification of Figure 6 consists in the particular prism means associated with the instrument. In this form, the prism means may comprise two prisms which are each substantially similar to the triangularly shaped prism 20 and which are arranged so that their hypotenuse faces or bases are adjacent to each other or the prism means may be formed of two prisms of this nature which have been truncated. One of these, for example the prism 38, functions as an entrance prism which allows light rays to enter the prism means while the other, that is the prism 39, serves as an exit prism to permit light rays to leave the prism means. Figure 6 shows the prisms 38 and 39 in truncated form.

Essentials of the prism means include the necessity of an entrance prism having an entrance surface 40 oblique to its hypotenuse face or base 42 and an exit prism having an exit surface 41 oblique to its hypotenuse face or base 43. The oblique entrance and exit faces 40 and 41 should extend from their respective bases for a distance sufficient to permit the passage through the prism means of all light rays effective in determining refractive index over the range covered by the instrument. This latter condition also exists in connection with the bases 42 and 43 of the entrance and exit prisms.

The angle between the entrance face 40 and its base 42 should equal the angle between the exit face 41 and its base 43 assuming that prisms 38 and 39 are of the same refractive index. In this connection, the refractive index of the prisms should be greater than that of the specimen to be analyzed. Generally, both prisms are chosen of the same index although it is possible to use prisms of unequal refractive index provided that the angles which the entrance and exit faces 40 and 41 make with their bases, which angles will in this latter instance be unequal, are so selected as to compensate for the difference in index of the prisms 38 and 39. As heretofore pointed out, these angles are determined in a manner well known to the art which requires no explanation.

Another condition which needs to be satisfied, is the positioning of the entrance and exit prisms so that their respective bases 42 and 43 lie in parallel planes when the refractometer is in operating order. As a result, the entrance face 40 and the exit face 41 will be parallel to each other where, as in the usual case, the angle between the entrance face 40 and its base 42 is equal to the angle between the exit face 41 and its base 43.

Upon satisfaction of the foregoing conditions it will be evident that the second oblique surface 44 of the entrance prism 38 and the second oblique surface 45 of the exit prism 39 may form any convenient angle with their respective bases and further that it is immaterial whether or not the oblique surfaces of each prism are completed to form an edge opposite to their respective bases. To fully illustrate these possibilities, the entrance and exit prisms 38 and 39 have been shown in truncated form in Figure 6. In fact, the ability to employ truncated prisms with the refractometer can be utilized to advantage in providing a compact instrument design.

The entrance prism 38 may be supported from the instrument casing by means similar to the construction shown in Figure 2 for supporting prism 20, a casing 10' being indicated for this purpose, while the exit prism 39 may be hingedly supported from the casing on the hinged member 26' mounted on the casing in a manner like the cover 26 of Figure 2. In Figure 6, the specimen to be analyzed is placed between the prism bases 42 and 43, the latter serving in the nature of a specimen cover. The usual observation button 24″ is cemented to the exit face 41 of the prism 39, which face is preferably provided with an apertured plate 21″ used as a diaphragm to limit the field of view to that part of the image which is free from aberration produced by lens 18′. Means permitting the fine adjustment of the prisms 38 and 39 and the lens means 18′, similar to fine adjustment means disclosed in connection with the form of the invention shown in Figure 2, are readily adapted for use with the instrument of Figure 6. Similar consideration is given to the angular setting of the prism means with respect to the optical axis of the lens 18′ as in the case of the single prism 20 and the lens 18 of Figure 2.

In carrying out the refraction of a specimen, it is placed on the base 42 of the entrance prism 38, the exit prism 39 is moved into operating position and the instrument is pointed towards a light source. To fully illustrate the operation of the modified refractometer, I have shown in Figure 6 the manner in which the light rays from the light source pass through the instrument. Accordingly, assumed border rays 46 and 47, an assumed axial ray 48 and a ray 49 representative of the critical ray, as will be shortly explained, are traced through the optical system.

All of these just mentioned rays are converged by the lens 18′ onto the entrance surface 40 of the prism 38 and on entering this prism are refracted towards its base 42. Each of these rays will strike the base 42 at a different angle of incidence. In accordance with accepted theory, one ray which passes through the system, such as the assumed critical ray 49, will strike the base 42 at the so-called critical angle. This ray and all other rays, such for example as the border ray 46 and axial ray 48, which have an angle of incidence with the base 42 that is less than the critical angle will be refracted by the entrance prism and will pass into the specimen.

Since the specimen is of less refractive index than the prism 39, all rays such as the rays 46, 48 and the critical ray 49 which enter the specimen will pass therethrough and will be refracted by the base 43 of the exit prism 39 to pass through the observation button 24″ to the eye of an observer. On the other hand, any ray which has an angle of incidence with the base 42 of the entrance prism 38 which is greater than the critical angle will be reflected towards the oblique face 44 of the entrance prism in accordance with the principles of total reflection and will be lost to the observation button 24″ and to an observer. The border ray 47 and all rays passing through the system between it and the critical ray 49 are rays which will be reflected by the base 42 of the entrance prism inasmuch as all of these latter rays have an angle of incidence which is greater than the critical angle.

Figure 7:
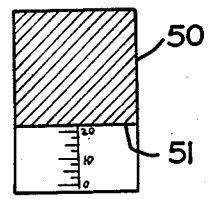
Figure 7 shows the image seen by an observer when using the modified form of refractometer disclosed in Figure 6.

An observer looking through the button 24″ traces the rays 46, 48 and 49, and in fact all of the rays refracted through the prism means, backwards towards the light source and sees by reason of these rays a magnified virtual image of the scale such as is indicated by the reference numeral 50 in Figure 7. In the observer's field of view there is also seen a shadow which is caused by reflected rays, such as the ray 47 and all rays like it, these rays being lost to the eye in the prism 38. This shadow appears as a virtual image which is superposed on the virtual image of the scale formed by the lens 18′.

As may be noted in Figure 7, the shadow appears at the top of the scale image and not at the bottom thereof as seen in Figure 5. This is due to the fact that the light rays lost to the eye in the modified form of instrument are the rays reflected by the prism means and not the refracted rays as is the case in the form of refractometer disclosed in Figure 2. A boundary line 51 marks the edge of the shadow shown in Figure 7 and denotes the division between the shadow and the remainder of the scale image. In Figure 7, the portion of the scale image covered by the shadow will be invisible as any secondary reflected light at the interface between the base 42 of prism 38 and the specimen will be directed into the prism 38 and consequently lost to the eye.

The modified form of the invention, as it has been inferred, is distinguished from the refractometer of Figure 2, in that in the modification, an observer sees the scale due to refraction of light, while in the instrument of Figure 2 the scale is seen by reflection. Both types of instrument, however, make similar use of the critical ray to determine the index of a specimen by its effect upon the position of the boundary edge of the shadow seen on the image of the scale.

In the case of the instrument of Figure 2, all light rays which have an angle of incidence greater than the critical ray, that is to say, all rays which fall on one side of the critical ray and are reflected, are directed through prism 20 to the button 24′. However, the critical ray is refracted and hence does not reach the eye. The instrument of Figure 6 is distinguished from this by using all rays which lie on the other side of the critical ray, that is, rays which have an angle that is less than the critical angle, plus the critical ray itself for the purpose of allowing an observer to see the scale image through the exit face of the prism 39. In this latter instance, the critical ray is actually the limiting ray or ray of greatest angle of incidence which is transmitted by refraction.

Primarily, the essential parts of the modified form of the invention like the instrument of Figure 2 comprise scale means, prism means and a specimen support. Hence, with loss in accuracy and with increase in instrument size but without other effect upon the performance of the instrument, the diffusing disk 15′, employed to give an evenly illuminated field, may be dispensed with as may the lens 18′ and aperture plate 21″ which latter are used to the end of avoiding paralllax and spherical aberration.

From the foregoing, it may be observed that I have attained the aims and objects of my invention in that I have provided a small, compact refractometer of simple design and rugged construction. Also, it will be appreciated that the novel forms of refractometers which I have shown and described, because of their special design and the particular arrangement of their parts, afford highly accurate and practical instruments which are available for use over a relatively wide range of indices.

I claim:

1. A refractometer comprising a support, scale means mounted near one end of the support, prism means mounted at the other end of the support, said prism means having an entrance surface facing said scale means, an exit surface through which an observer looks and a surface against which is placed a specimen the refractive index of which is to be measured, a cover for the exit surface, said cover having an observation opening, means for holding the specimen to be measured against the third mentioned surface of the prism means, said entrance and exit surfaces forming substantially equal angles with the third mentioned surface of the prism means, said scale means being visible and readable through said prism means, and said scale means and said prism means being relatively positioned so that the boundary edge of a shadow which is produced by the specimen being measured and which appears in the field of view of the prism means extends transversely of the axis of the scale means.

2. A refractometer comprising a support, a light transmitting member secured on one end of the support, scale means on said member, diffusing means for modifying the light before passing through the member, prism means mounted on the other end of said support, lens means mounted on said support between the prism means and the scale means, said lens means spaced from the scale means by a distance substantially equal to the focal length of the lens means, said prism means having an entrance surface facing the lens means, a surface against which is placed a specimen the refractive index of which is to be measured and an exit surface into which the observer looks, the entrance and exit surfaces forming substantially equal angles with said second mentioned surface of the prism means, said scale means and said prism means being so located with respect to each other that the boundary edge of a shadow produced in the field of view of the prism means by a specimen being measured lies across the axis of the scale means.

3. A refractometer comprising a housing, a diffusing light transmitting member mounted in one end of the housing, scale means mounted in said housing adjacent said member, prism means mounted in the other end of said housing, said prism means having an entrance surface facing said scale means, an exit surface and a surface against which is placed a specimen the refractive index of which is to be measured, said entrance and exit surfaces forming substantially equal angles with said last mentioned surface of the prism means, means for holding a specimen against said last mentioned surface of said prism means, and an opaque plate covering said exit surface, said plate having a viewing aperture, said scale means and said prism means relatively positioned so that the boundary edge of a shadow produced by a specimen being measured and which appears in the field of view of the prism means extends across the axis of the scale means.

4. A refractometer comprising a support, a light diffusing member positioned on one end of the support, prism means positioned on the other end of the support, scale means positioned on said support adjacent to said member, lens means positioned on said support between said prism means and said scale means, said scale means being spaced from the lens means by a distance substantially equal to the focal length of the lens means, said prism means having a hypotenuse face and two side faces, the angles between the hypotenuse face and each side face being substantially equal, and means for holding a specimen the refractive index of which is to be measured against said hypotenuse face, said scale means and said prism means being so located with respect to each other that the boundary edge of a shadow produced in the field of view of the prism means by a specimen being measured appears transversely of the scale means.

5. A refractometer comprising a housing, a light transmitting member carrying scale means mounted in and adjacent to one end of the housing, a prism mounted in the other end of the housing, lens means located within the housing between the prism and said member for forming a virtual image of said scale means, said prism having an entrance surface facing said lens means, a base surface against which is placed a specimen the refractive index of which is to be measured, and an exit surface into which an observer looks, said entrance and exit surfaces forming substantially equal acute angles with said base surface, and means for holding a specimen against said base surface, the scale means being visible and readable through said prism, and said prism and said scale means being relatively positioned so that the boundary edge of a shadow which is produced by the specimen being measured and which appears in the field of view of the prism extends across the axis of the scale means.

6. A refractometer comprising a housing, a diffusing light transmitting member mounted in one end of the housing, a light transmitting member carrying scale means mounted in said housing adjacent to said disk, prism means mounted in the other end of said housing, lens means positioned in said housing between said prism means and said scale means and located at a distance from the latter which is substantially equal to the focal length of the lens means, said prism means comprising a member of refractive material having an entrance surface facing the lens means, a base surface against which is placed a specimen the refractive index of which is to be measured, and an exit surface into which an observer looks, the entrance and exit surfaces forming substantially equal acute angles with the base surface, the optical axis of the lens means forming an acute angle with the plane of said base surface and means for holding a specimen against said base surface, said prism means and scale means being relatively positioned so that the boundary edge of a shadow which is produced by a specimen being measured and which appears in the field of view of the prism means extends across the axis of the scale means.

7. A refractometer having a housing, a light transmitting member carrying scale means mounted in and adjacent one end of the housing, prism means mounted at the other end of said housing, lens means located within the housing between the prism and said scale means for forming a virtual image of the scale means, said prism means comprising two spaced prism members of refractive material supported by said housing, each prism member having a base surface, said base surfaces being substantially parallel to each other when in operating position and providing means for holding between them a specimen the refractive index of which is to be measured, one of said prism members having an entrance surface facing said scale means, and the second of said prism members having an exit surface through which an observer looks, viewing means adjacent the exit surface, said entrance and exit surfaces being substantially parallel to each other, said scale means being visible and readable through said prism means, and said prism means and scale means being relatively positioned so that the boundary edge of a shadow which is produced by a specimen being measured and which appears in the field of view of the prism means extends across the axis of the scale means.

8. A refractometer having a support, a light diffusing member positioned on one end of the support, prism means positioned on the other end of the support, scale means positioned on said support adjacent to said light diffusing member, lens means positioned on said support between said prism means and said scale means at a distance from the scale means substantially equal to the focal length of the lens means, said prism means comprising two spaced prism members each having a base surface, said base surfaces being supported in substantial parallel relation to each other when in operating position and providing means for holding between them a specimen the refractive index of which is to be measured, one of said prism members having an entrance surface facing said scale means, and the second of said prism members having an exit surface through which an observer looks, said entrance surface and exit surface forming substantially equal acute angles with their respective base surfaces, said prism means and scale means being so located with respect to each other that the boundary edge of a shadow produced in the field of view of the prism means by a specimen being measured appears transversely of the scale means.

HAROLD W. STRAAT.